US010124550B2

(12) United States Patent
Massoptier-David et al.

(10) Patent No.: US 10,124,550 B2
(45) Date of Patent: Nov. 13, 2018

(54) DEVICE AND METHOD FOR VULCANIZING TIRES

(71) Applicants: COMPAGNIE GENERALE DES ETABLISSEMENTS MICHELIN, Clermont-Ferrand (FR); Michelin Recherche et Technique S.A., Granges-Paccot (CH)

(72) Inventors: Michaël Massoptier-David, Clermont-Ferrand (FR); Franck Guerin, Clermont-Ferrand (FR); Thomas Simonelli, Clermont-Ferrand (FR)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 7 days.

(21) Appl. No.: 15/524,773

(22) PCT Filed: Nov. 19, 2015

(86) PCT No.: PCT/EP2015/077125
§ 371 (c)(1),
(2) Date: May 5, 2017

(87) PCT Pub. No.: WO2016/079249
PCT Pub. Date: May 26, 2016

(65) Prior Publication Data
US 2017/0355157 A1     Dec. 14, 2017

(30) Foreign Application Priority Data

Nov. 19, 2014   (FR) ...................... 14 61186

(51) Int. Cl.
*B29D 30/06*     (2006.01)
*B29C 33/04*     (2006.01)
*B29C 35/04*     (2006.01)

(52) U.S. Cl.
CPC .......... *B29D 30/0662* (2013.01); *B29C 33/04* (2013.01); *B29C 35/04* (2013.01);
(Continued)

(58) Field of Classification Search
CPC ............ B29D 30/0606; B29D 30/0662; B29D 2030/0669; B29D 2030/0674; B29D 2030/0677
See application file for complete search history.

(56) References Cited

U.S. PATENT DOCUMENTS 4,545,750 A * 10/1985 Sarumaru .......... B29D 30/0601
425/32
5,186,951 A *  2/1993 Siegenthaler ...... B29D 30/0662
425/28.1
(Continued)

FOREIGN PATENT DOCUMENTS

DE    10 2012 108 803 A1    3/2014
EP        0 578 105 A2      1/1994
(Continued)

OTHER PUBLICATIONS

International Search Report (with translation) issued by WIPO in International Application No. PCT/EP2015/077125, dated Feb. 3, 2016.

*Primary Examiner* — James P Mackey
(74) *Attorney, Agent, or Firm* — Fitzpatrick, Cella, Harper & Scinto

(57) ABSTRACT

A tire vulcanizing device includes a vulcanization mold and a central part. The vulcanizing mold includes molding parts that defining a curing chamber therebetween. Inside the curing chamber is arranged a heating and ventilation appa-
(Continued)

ratus structured for use with a heat-transfer fluid. The central part is structured to collaborate with the vulcanization mold by providing support to a heat-transfer fluid inlet and establishing communication between the heat-transfer fluid inlet and the curing chamber. The central part includes heating elements that are configured to be brought into operation before the heating and ventilation apparatus is brought into operation to cure a tire using the heat-transfer fluid.

11 Claims, 2 Drawing Sheets

(52) U.S. Cl.
CPC ............... *B29D 2030/0669* (2013.01); *B29D 2030/0674* (2013.01); *B29D 2030/0677* (2013.01)

(56) References Cited

U.S. PATENT DOCUMENTS

| | | | |
|---|---|---|---|
| 5,683,643 A | 11/1997 | Laurent | 264/315 |
| 6,474,968 B1 | 11/2002 | Mitamura et al. | 425/40 |
| 2006/0012076 A1 | 1/2006 | Caretta et al. | 264/326 |
| 2008/0277815 A1 | 11/2008 | Kaneda | 264/40.6 |

FOREIGN PATENT DOCUMENTS

| | | |
|---|---|---|
| EP | 0 686 492 A1 | 12/1995 |
| GB | 2 091 173 A | 7/1982 |
| WO | WO 2013/164282 A1 | 11/2013 |

\* cited by examiner

DEVICE AND METHOD FOR VULCANIZING TIRES

FIELD OF THE INVENTION

The invention relates to the field of tire manufacture and relates more particularly to devices for vulcanizing tires.

RELATED ART

Traditionally, these devices are formed of a press comprising a lower bowl and an upper bowl, or cover, the function of which is to contain a curing mould and keep it in a closed position for the duration of the vulcanization. As a general rule, the mould is connected to the press by two planar surfaces more commonly referred to as platens.

The mould, which is specific to a size of tire is formed by the collection of components intended to be brought into contact with the tire that is to be vulcanized and comprises lower and upper shells, intended to mould the sidewall regions, bead rings, an upper one and a lower one intended to mould the beads and the bottom region of the sidewalls, and a collection of segments, bearing the imprint of the tread and able to move radially under the action of a clamping ring.

The internal walls of the components of the mould define a curing chamber intended to be brought into contact with the unvulcanized green tire. Inside the tire, a pressurized heat-transfer fluid allows pressure to be applied, to press the green tire firmly against the internal walls of the mould, and allows the thermal energy required for vulcanizing to be supplied. Some of the thermal energy of vulcanization may also be supplied to the green tire from the outside, via the shells and the segments.

As a general rule, a curing bladder is installed inside the central part of the curing chamber, between two platens, an upper one and a lower one, and deploys under the effect of the pressure of the heat-transfer fluid so as to become interposed between the said heat-transfer fluid and the radially internal part of the tire. The heat-transfer fluid, generally steam or nitrogen under pressure, circulates in the vulcanizing device between a supply source and the curing chamber.

The heat-transfer fluid is introduced into the chamber either heated beforehand or heated by heating elements placed inside the curing chamber. However, it has been found that, in both instances, because of the significant thermal inertia of the components of which the mould and the press are made, for a given set point curing temperature, the first cures do not take place at the correct temperature, leading to defects in the tires.

In order to alleviate this problem, one solution has been to set a higher set point temperature for the first few cures, and then to decrease it thereafter. However, it has been found that such a solution is not suitable, again because of the high thermal inertia of the curing assembly which accumulates heat and then over-cures the tire.

Document EP 0 686 492 discloses a unit for heating and agitating a charge of pressurized heat-transfer fluid, comprising a turbine operated by an electric motor and a resistive heating element, these elements being arranged in the curing chamber of a vulcanizing press. More specifically, the turbine and the electric motor that drives it are enclosed in a fluidtight chamber containing the heat-transfer fluid. A resistive electrical element is also immersed in the heat-transfer fluid and the temperature of the heat-transfer fluid is regulated by controlling the thermal flux dissipated by the resistive element. One solution for using the device described in that document to overcome the disadvantages associated with bringing the assembly up to the correct temperature for the first few cures is to adjust the curing time according to the number of cures performed. To do that, correctors are installed which adjust the curing parameters, notably the temperature and pressurized cure duration according to the number of cures. Thus, in an example of the curing of a passenger vehicle tire, for a moulding component temperature of around 174° C. during the first cure, the set point curing temperature of which is equal to 180° C., a pressurized cure duration equal to around 14 min is established whereas, for the same tire, when the temperature of the moulding components is stabilized after several successive cures, and for the same set point curing temperature, the duration of the time spent under pressure is 9.5 min. Various values for these parameters have had to be established for intermediate set points and need to be applied for each cure. What is more, the various values established for the various parameters need to be applied to each size of tire.

This approach admittedly does lead to correct curing of the tire being achieved by applying these corrective factors to each curing cycle, but at the expense of the productivity of the vulcanizing press and also for a higher operating cost given the adjustments that have to be made for a fairly high number of curing cycles.

Documents US 2006/0012076, WO 2013/164282 and U.S. Pat. No. 6,474,968 disclose solutions aimed at heating the mould and/or the working fluid using different heating elements. None of these documents describes a solution that allows the moulds to be brought up to the correct temperature prior to curing.

BRIEF DESCRIPTION OF EMBODIMENTS OF THE INVENTION

It is an objective of the invention to propose a device and a method for vulcanizing tires that overcome these disadvantages.

To this end, the invention proposes tire vulcanizing device comprising a vulcanizing mould comprising moulding parts between them defining a curing chamber inside which there is arranged a heating and ventilation unit for the heat-transfer fluid, and collaborating with a central part providing support to a heat-transfer fluid inlet and establishing communication between the heat-transfer fluid inlet and the said curing chamber, characterized in that the said central part comprises heating elements which are produced in such a way as to be brought into operation before the heating and ventilation unit for the heat-transfer fluid that cures the tire is brought into operation.

According to the invention, the central part of the mould which acts as a support and serves to establish communication between the curing chamber and the heat-transfer fluid inlet into the chamber comprises its own heating elements other than those used for heating the heat-transfer fluid of the curing chamber. In addition, the device comprises control means which bring the heating elements of the central part into operation before the heating and ventilation unit for the heat-transfer fluid is brought into operation with a view to curing. In this way, the central part of the mould can be heated independently of the heating of the chamber, and, it will be understood, to temperature values and at times that are different by comparison with the heating of the curing chamber. This allows the mould to be brought up to temperature and the temperature of the mould to be stabilized before the curing of the tire has begun and without needing to heat the heat-transfer fluid beforehand. A tire curing cycle is thus performed at temperature and time values that are optimized for a given type of tire achieving a gain in productivity of the vulcanizing operation, the mould always being at the correct temperature before the curing cycle is begun.

Heat losses from the curing chamber are thus limited and in this way curing of the tire with the correct temperature and pressurized cure duration parameters is achieved right from the first cure. This makes it possible to dispense with the various correctors of curing parameter values which took account of the number of cures and thus makes it possible to gain in productivity and make savings in terms of labour costs. What is more, a very good energy efficiency of the cure is achieved, this being due both to the electrical heating of the curing chamber and to the limiting of the heat losses in the central part of the mould.

For preference, the device comprises a vulcanizing bladder held by its beads on platens and the said central part comprises a casing arranged in an opening of a platen.

Advantageously, the said heating elements are electrical heating elements which heat the casing by conduction.

In one advantageous embodiment of the invention, the said heating elements comprise a ring fitted with a resistive electrical heating element which is fixed on the base of the casing.

In another advantageous embodiment of the invention, the said heating elements comprise several heating cartridges fixed to the base of the casing.

In yet another advantageous embodiment of the invention, the said heating elements comprise a heating sheet arranged on the periphery of the casing.

Advantageously, the said central part comprises a temperature probe connected to means of regulating the power of the said heating elements.

For preference, the said casing contains the heating and ventilation unit for the heat-transfer fluid inside the curing chamber.

Advantageously, the said casing closes the curing chamber in fluidtight manner.

For preference, the set point temperature values measured with the said probe are comprised between 130 and 150° C.

The objects of the invention are also achieved with a method for vulcanizing a tire using a vulcanizing device according the invention, comprising a vulcanizing mould comprising moulding parts between them defining a curing chamber inside which there is arranged a heating and ventilation unit for the heat-transfer fluid, and collaborating with a central part providing support to a heat-transfer fluid inlet and establishing communication between the heat-transfer fluid inlet and the said curing chamber, characterized in that it comprises a step of heating the said central part which step is performed independently of and before that of heating the fluid of the curing chamber.

BRIEF DESCRIPTION OF THE DRAWINGS

The invention will be better understood from the remainder of the description, which is supported by the following figures:

FIG. 1b is a view on a larger scale of detail B of FIG. 1a;

In the various figures, elements that are identical or similar bear the same reference. Their description is therefore not systematically repeated.

DETAILED DESCRIPTION OF EMBODIMENTS OF THE INVENTION

Figure 1A:
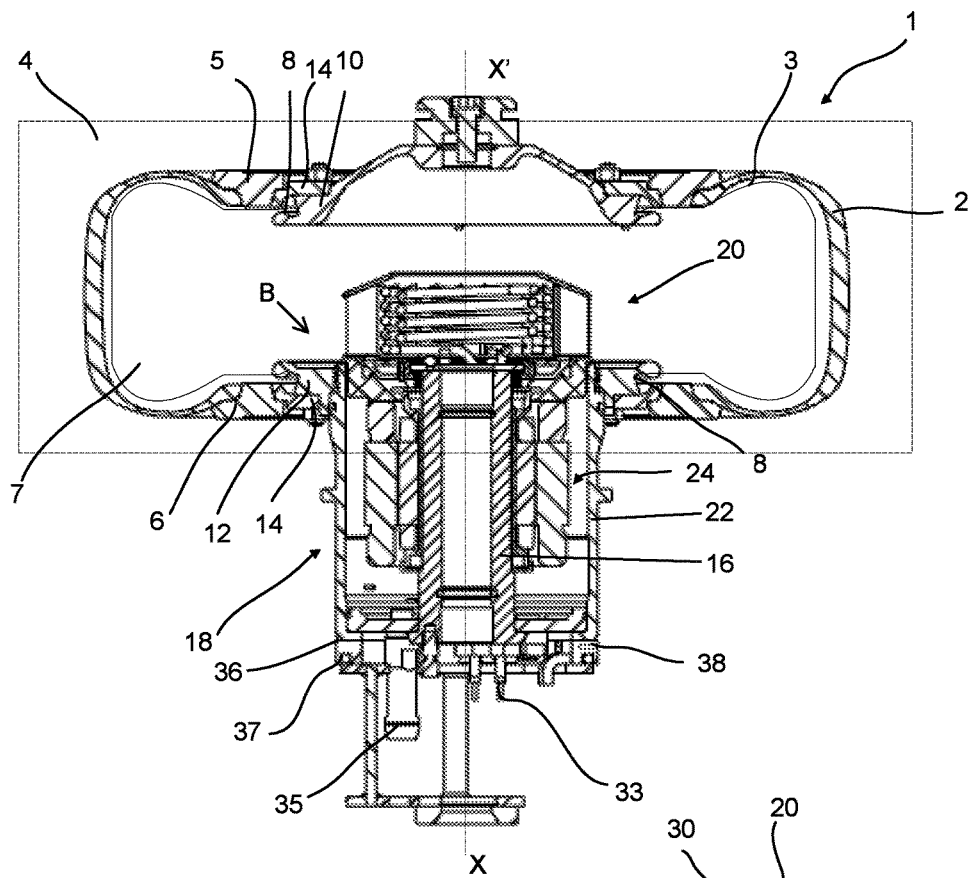
FIG. 1a is a view in cross section of the vulcanizing device according to a first exemplary embodiment of the invention.
Figure 1B:
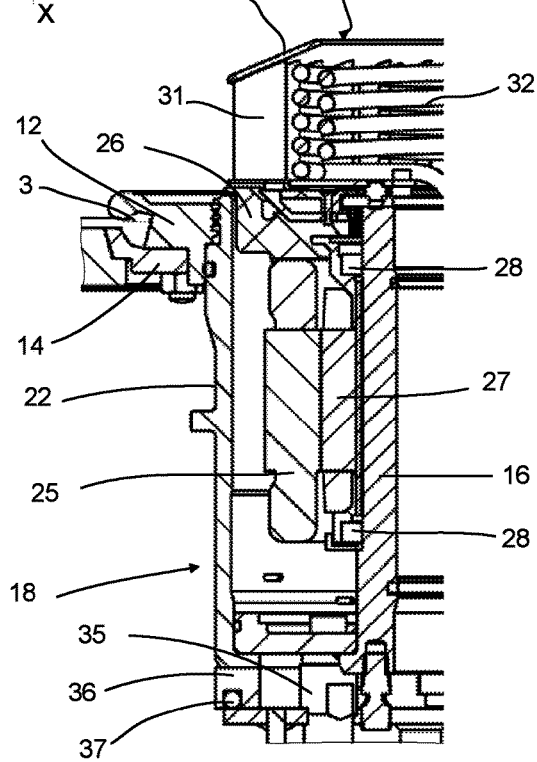

FIG. 1 depicts, in a view in axial section, a vulcanizing device 1 illustrated during an operation of vulcanizing a tire 2. In the example depicted in the figures, the vulcanizing device uses an elastic vulcanizing bladder 3 which contain a heat-transfer fluid during the tire vulcanizing operation. For preference, the heat-transfer fluid is a neutral gas, such as nitrogen for example. The bladder 3 with an upper platen 10 and a lower platen 11 defines a curing chamber 7. It is surrounded by the rigid moulding parts of a mould 4, notably the rings for the beads 5, 6, the upper and lower shells, and the collection of circumferential segments (which are not depicted in the figures). The mould 4 thus formed, depicted schematically in broken line in the figures, exhibits symmetry of revolution about an axis X-X'. In operation, a green tire is introduced into the mould, the mould is closed, and a heat-transfer fluid is introduced under pressure into the curing chamber, causing the bladder 3 to press firmly against the internal part of the green tire.

The vulcanizing bladder 3 is provided with beads 8 which are fixed to the upper and lower platens 10, 12 using the flanges 14. The lower platen 12 has an annular overall shape and through its centre may pass a sliding operating rod concentric with the axis X-X' (the rod is not depicted in the drawings) and passing through a protective sleeve 16. One of the ends of the sliding rod is fixed to the upper platen 10 and the other end to a mechanism driving it in translation along the axis X-X' so as to move the upper platen 10 and thus allow the bladder 3 to deploy and to fold during operation.

The lower platen 12 supports a central part 18 of the device which provides communication between the heat-transfer fluid and the curing chamber 7 and which supports the heat-transfer fluid inlet pipe. A heating and ventilation unit 20 is arranged inside the curing chamber 7. The heating and ventilation unit 20 comprises a heating element depicted in the figures in the form of a resistive electrical element 32 and a turbine 30 which are arranged concentrically with respect to the axis X-X' inside the curing chamber.

In the examples depicted in the attached figures, the central part 18 forms a support for the single heating and ventilation unit 20 for the heat-transfer fluid. The central part 18 is defined in the region of the central passage in the platen 12, the said passage being closed by a casing 22 which extends on an opposite side of the curing chamber 7. The casing 22 is fixed to the platen 12 for example by a screw fixing. The casing 22 contains an electric motor 24 of which the stator 25 is fixed to the casing 22 via a flange 26 and the rotor 27 is mounted on a tube 28, itself mounted on rolling bearings 28 keyed to the sleeve 16. The tube 28 rotationally drives the turbine 30 formed by blades 31 about the axis X-X'. The turbine 30 is arranged around the resistive electrical element 32. The resistive electrical element 32 is supported by the flange 26 and powered at its connection pads 33. The casing 22 is made of a conductive metallic material, for example aluminium, and preferably has a shape of revolution of the axis X-X'.

The heat-transfer fluid is introduced under pressure into the curing chamber 7 at the start of the curing cycle and extracted therefrom at the end of the cycle via a pipe 35 fitted with a self-closing valve, the pipe being supported at one of its ends by the base of the casing 22. In a way similar to the device described in document EP 0 686 492, the curing chamber 7 forms with the casing 22 and the rod for the operation of the platen 10 a fluidtight chamber inside which the heat-transfer fluid circulates, seals being provided for this purpose between the various components of the central part 18.

As in the aforementioned document, the heat-transfer fluid is introduced at ambient temperature and under pressure into the curing chamber 7 and is then circulated by the turbine 30 while being heated by the resistive electrical element 32. Under the action of the turbine 30, the heat-transfer fluid is drawn up into the central part of the turbine, passes between the turns of the resistive electrical element 32, and is then ejected in the bottom part of the curing chamber 7 where it sweeps over the walls of the bladder 3, exchanges of heat with the inside of the green tire taking place through the bladder. In a known way, the tire is also heated from the outside by providing the moulding parts of the mould with electrical heating elements. Likewise in a known way, the mould is thermally insulated from the ambient surroundings, notably by arranging layers of thermal insulation between the mould and the upper and lower platens of the press, and by surrounding the cylindrical external surface of the mould with a thermally insulating mat.

According to the invention, the central part 18 comprises its own heating elements which are powered before the heating and ventilating unit 20 used for curing is powered with a view to curing. More specifically in the exemplary embodiment of FIGS. 1a and 1b, a metal ring 36 is fixed to the base of the casing 22, on the outside thereof, and encloses a resistive electrical element 37. The ring 36 is advantageously a ring made of aluminium and the resistive electrical element 37 is a screened resistive element placed inside the ring 36. When powered, the resistive electrical element 37 heats the casing 22 by conduction.

Specifically, the casing 22 passes through the platen 12 of the mould and also the platen (not illustrated) of the curing press holding the mould 4. As a result, it constitutes a heat sink through which the heat energy from the mould passes and the detrimental influence of which is felt especially at the start of curing. Thus, by heating the casing 22 and, therefore, the central part 18 of the mould prior to curing, the mould is brought up to the correct temperature and the temperature of the mould is stabilized before the curing of the tire is begun.

Figure 2:
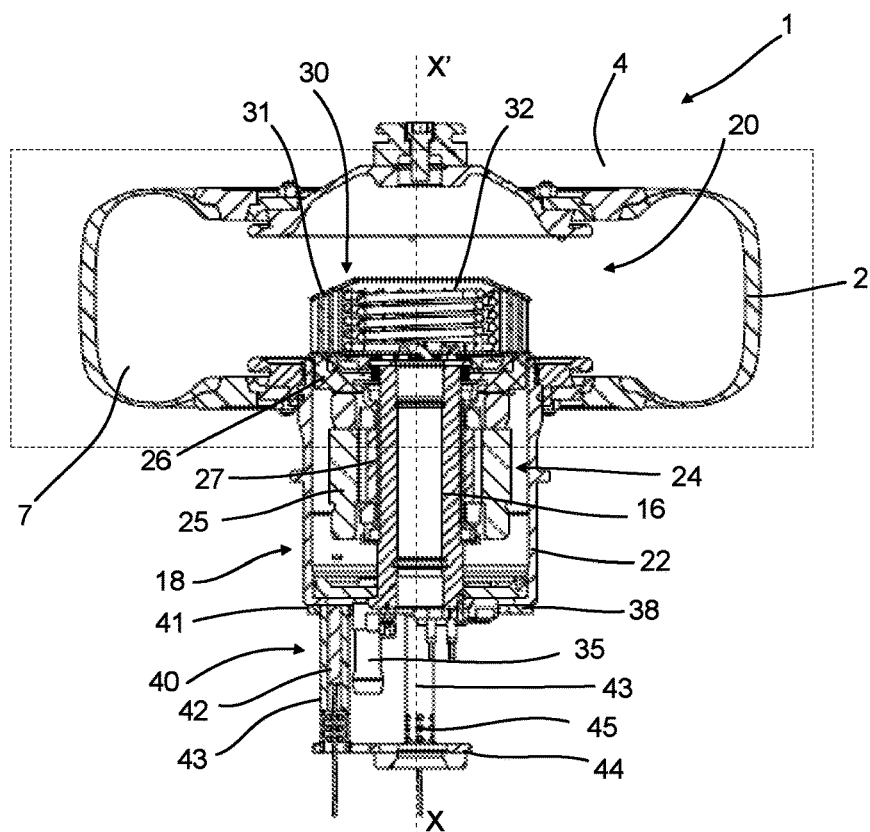
FIG. 2 is a view in cross section of the vulcanizing device according to a second exemplary embodiment of the invention.

In the exemplary embodiment of FIG. 2, a support piece 40 co-axial with the axis X-X' supports a number of cylindrical heating cartridges 42 arranged with their longitudinal axis parallel to the axis X-X'. The support piece 40 comprises a ring 41 fixed to the base of the casing 22 concentrically with respect to the axis X-X', columns 43 connecting the ring 41 and a base 43, parallel to the ring 41. The longitudinal axis of each column 43 is parallel to the axis X-X' and each column contains a heating cartridge 42, for example a screened resistive electrical element. The base of each column 43 is provided with orifices 45 for the cooling of the base 43 of the support piece 40.

Figure 3:
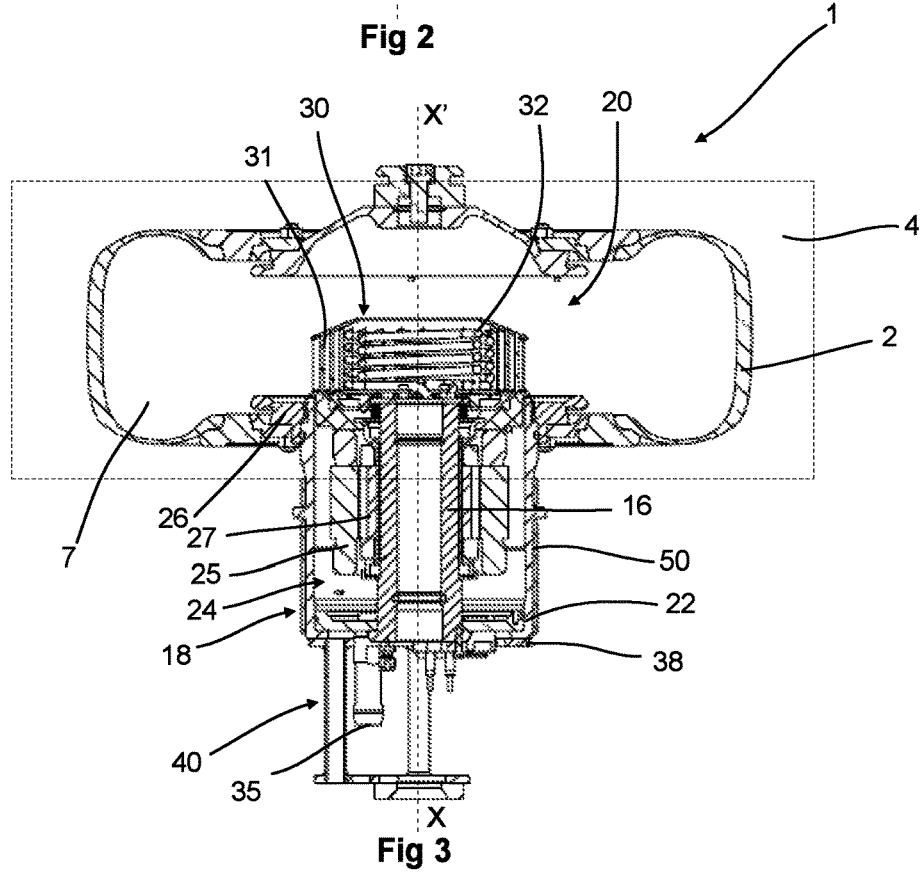
FIG. 3 is a view in cross section of the vulcanizing device according to a third exemplary embodiment of the invention.

In the example illustrated in FIG. 3, the casing 22 is heated by conduction using an electric heating sheet 50 arranged at the periphery of the casing 22 on the lateral surface thereof. The heating sheet 50 extends from the base of the casing 22 over a height equal approximately to ⅔ of its height. The bladder 3 has not been depicted in FIGS. 2 and 3 but it will be appreciated that it is held on the platens 10, 12 using the flanges, as in the example of FIGS. 1a and 1b.

A temperature probe 38 mounted on the ring 36 or, respectively, on the ring 41, sends the measured values of the temperature of the ring 36, 41 to a control unit (not depicted in the drawings) which controls the supply of power to the screened resistive electrical element 37 or, respectively, to the heating cartridges 42 or to the heating sheet 50.

The control unit thus allows control over the switching on and off of the supply of power to the heating elements 37, 42, 50 of the casing 22 according to information received from the temperature probe 38. When the data from the probe 38 indicate that the set point temperature is reached, the supply of power to the heating elements is switched off and curing may begin. In an alternative form, supply of power to the heating elements 37, 42, 50 is maintained during curing, while at the same time their supply of power is regulated according to the set point temperature.

In another alternative form, a layer of thermal insulation is used to insulate the exterior surface of the casing 22.

In operation, the control unit controls the heating of the ring 36, 41 to a pre-established set point temperature of between 130 and 150° C., according to the type of tire to be vulcanized. As soon as the set point temperature is reached, the control unit informs the central control unit of the vulcanizing device that the vulcanizing cycle may commence. With the green tire loaded into the vulcanizing device and the pressurized heat-transfer fluid present in the curing chamber, the central unit commands the circulating of this fluid by the rotation of the turbine 30 and the heating thereof by the resistive electrical element 32 to a pre-established set point temperature and for a given pressurized cure duration, these parameters being established according to the type of tire to be vulcanized. Thus, for a passenger vehicle tire, a set point temperature for curing of 180° C. and a pressurized cure duration of 9.5 min are established, these parameters being kept constant throughout all of the cures performed with the vulcanizing device of the invention. This is due to the fact that the central part of the mould is at the correct temperature right from the start and no longer acts as a heat sink through which the heat energy from the curing chamber 7 escapes. In this way, it is possible to achieve curing under pre-established optimum parameter conditions right from the start and throughout all the cures performed with the vulcanizing device of the invention, thereby allowing an increase in productivity, it being possible for the heating of the central part to be performed as a parallel process (for example while the tire is being loaded into the mould).

The embodiments described hereinabove are of course non-limiting and a person skilled in the art may be able to envisage other equivalent means that allow the central part of the vulcanizing device to be heated independently. Thus, a cylindrical electrical heating element in the form of a heating electric film may be arranged on the cylindrical lateral surface, on the outside and/or on the inside of the casing 22. The use of other electrical heating means, such as inductive heating means, may also be envisaged, the casing 22 then being made from a ferromagnetic material.

The invention claimed is:

1. A tire vulcanizing device comprising:
   a vulcanizing mould that includes moulding parts defining a curing chamber therebetween, the curing chamber having arranged therein a heating and ventilation apparatus structured for use with a heat-transfer fluid; and a central part arranged to collaborate with the vulcanizing mould by providing support to a heat-transfer fluid inlet and establishing communication between the heat-transfer fluid inlet and the curing chamber, wherein the central part includes heating elements that are configured to be brought into operation before the heating and ventilation apparatus is brought into operation to cure a tire using the heat-transfer fluid.

2. The device according to claim 1, further comprising: platens; and a vulcanizing bladder that includes beads structured to attach to the platens, wherein the central part includes a casing arranged in an opening of a platen of the platens.

3. The device according to claim 2, wherein the heating elements are electrical heating elements arranged to heat the casing by conduction.

4. The device according to claim 2, wherein the heating elements include a ring fitted with a resistive electrical heating element that is fixed to a base of the casing.

5. The device according to claim 2, wherein the heating elements include a plurality of heating cartridges fixed to a base of the casing.

6. The device according to claim 2, wherein the heating elements include a heating sheet arranged at a periphery of the casing.

7. The device according to claim 1, wherein the central part includes a temperature probe connected to a power regulator of the heating elements.

8. The device according to claim 2, wherein the casing surrounds the heating and ventilation apparatus.

9. The device according to claim 8, wherein the casing seals the curing chamber in a fluid-tight manner.

10. The device according to claim 7, wherein the temperature probe measures set-point temperature values in a range between 130° C. and 150° C.

11. A method for vulcanizing a tire, the method comprising steps of:

providing a vulcanizing device that includes:
    a vulcanizing mould that includes moulding parts defining a curing chamber therebetween, the curing chamber having arranged therein a heating and ventilation apparatus structured for use with a heat-transfer fluid, and
    a central part arranged to collaborate with the vulcanizing mould by providing support to a heat-transfer fluid inlet and establishing communication between the heat-transfer fluid inlet and the curing chamber, wherein the central part includes heating elements that are configured to be brought into operation before the heating and ventilation apparatus is brought into operation to cure a tire using the heat-transfer fluid; and heating the central part independently of and before heating the heat-transfer fluid of the curing chamber.

* * * * *